(12) United States Patent
Kumar et al.

(10) Patent No.: US 7,526,024 B2
(45) Date of Patent: Apr. 28, 2009

(54) STORING MACROBLOCKS FOR CONCATENATED FRAMES

(75) Inventors: Sathish Kumar, Bangalore (IN); Lakshmanan Ramakrishnan, Bangalore (IN); Darren Neuman, Palo Alto, CA (US)

(73) Assignee: Broadcom Corporation, Irvine, CA (US)

( * ) Notice: Subject to any disclaimer, the term of this patent is extended or adjusted under 35 U.S.C. 154(b) by 956 days.

(21) Appl. No.: 10/716,288

(22) Filed: Nov. 18, 2003

(65) Prior Publication Data

US 2005/0036554 A1 Feb. 17, 2005

Related U.S. Application Data

(60) Provisional application No. 60/495,405, filed on Aug. 15, 2003.

(51) Int. Cl.
*H04B 1/66* (2006.01)

(52) U.S. Cl. ............. 375/240; 375/240.25; 375/240.26; 375/240.01; 382/233; 382/235; 345/543; 345/544; 345/545; 345/547; 348/715; 348/714; 348/718; 348/716

(58) Field of Classification Search ................. 375/240, 375/240.25, 240.26, 240.02, 240.01; 382/233, 382/235; 345/543, 544, 545, 547; 348/715, 348/714, 718, 716
See application file for complete search history.

(56) References Cited

U.S. PATENT DOCUMENTS

| 5,920,352 A | * | 7/1999 | Inoue | 348/384.1 |
| 6,301,299 B1 | * | 10/2001 | Sita et al. | 375/240.01 |
| 6,836,273 B1 | * | 12/2004 | Kadono | 345/543 |

* cited by examiner

*Primary Examiner*—Shawn An
(74) *Attorney, Agent, or Firm*—McAndrews Held & Malloy Ltd.

(57) ABSTRACT

Presented herein is a system for storing macroblocks for concatenated frames. A decoder system comprises a frame buffer. The frame buffer comprises one or more rows. A particular one of the rows stores macroblocks from a plurality of frames.

15 Claims, 4 Drawing Sheets

| Bank 0 | Bank 1 | Bank 2 | Bank 3 |
|---|---|---|---|
| $A_00 - A_03$ | $A_04-A_07$ | $A_08-A_011$ | $A_012-A_015$ |
| $A_016 - A_019$ | $A_020-A_023$ | $A_024-A_027$ | $A_028-A_031$ |
| $A_032 - A_035$ | $A_036-A_039$ | $A_040-A_043$ | $A_044\ A_10-A_12$ |
| $A_13-A_16$ | $A_17- A_110$ | $A_111- A_114$ | $A_115- A_118$ |
| $A_119- A_122$ | $A_123- A_126$ | $A_127- A_130$ | $A_131- A_134$ |
| $A_135- A_138$ | $A_139- A_142$ | $A_143, A_144, A_20, A_21$ | $A_22-A_25$ |
| $A_26-A_29$ | $A_210-A_213$ | $A_214-A_217$ | $A_218-A_221$ |
| $A_222-A_225$ | $A_226-A_229$ | $A_230-A_233$ | $A_234-A_237$ |
| $A_238 – A_241$ | $A_242-A_244\ X$ | $B_00 - B_03$ | $B_04-B_07$ |
| $B_08-B_011$ | $B_012-B_015$ | $B_016 – B_019$ | $B_020-B_023$ |
| $B_024-B_027$ | $B_028-B_031$ | $B_032 – B_035$ | $B_036-B_039$ |
| $B_040-B_043$ | $B_044\ B_10 – B_12$ | $B_13 – B_16$ | $B_17-B_110$ |
| $B_111-B_114$ | $B_115-B_118$ | $B_119 – B_122$ | $B_123-B_126$ |
| $B_127-B_130$ | $B_131-B_134$ | $B_135 – B_138$ | $B_139-B_142$ |
| $B_143, B_144, B_20, B_21$ | $B_23 - B_26$ | $B_27- B_210$ | $B_211- B_214$ |
| $B_215- B_218$ | $B_219- B_222$ | $B_223- B_226$ | $B_227- B_230$ |
| $B_231- B_234$ | $B_235- B_238$ | $B_239- B_242$ | $B_242- B_244, X$ |
| $C_00 – C_03$ | $C_04-C_07$ | $C_08-C_011$ | $C_012-C_015$ |
| $C_016 – C_019$ | $C_020-C_023$ | $C_024-C_027$ | $C_028-C_031$ |
| $C_032 – C_035$ | $C_036-C_039$ | $C_040-C_043$ | $C_044\ C_10-C_12$ |
| $C_13-C_16$ | $C_17- C_110$ | $C_111- C_114$ | $C_115- C_118$ |
| $C_119- C_122$ | $C_123- C_126$ | $C_127- C_130$ | $C_131- C_134$ |
| $C_135- C_138$ | $C_139- C_142$ | $C_143, C_144, C_20, C_21$ | $C_22-C_25$ |
| $C_26-C_29$ | $C_210-C_213$ | $C_214-C_217$ | $C_218-C_221$ |
| $C_222-C_225$ | $C_226-C_229$ | $C_230-C_233$ | $C_234-C_237$ |
| $C_238 – C_241$ | $C_242-C_244\ X$ | $D_00 – D_03$ | $D_04-D_07$ |
| $D_08-D_011$ | $D_012-D_015$ | $D_016 – D_019$ | $D_020-D_023$ |
| $D_024-D_027$ | $D_028-D_031$ | $D_032 – D_035$ | $D_036-D_039$ |
| $D_040-D_043$ | $D_044\ D_10 – D_12$ | $D_13 – D_16$ | $D_17-D_110$ |
| $D_111-D_114$ | $D_115-D_118$ | $D_119 – D_122$ | $D_123-D_126$ |
| $D_127-D_130$ | $D_131-D_134$ | $D_135 – D_138$ | $D_139-D_142$ |
| $D_143, D_144, D_20, D_21$ | $D_23 - D_26$ | $D_27- D_210$ | $D_211- D_214$ |
| $D_215- D_218$ | $D_219- D_222$ | $D_223- D_226$ | $D_227- D_230$ |
| $D_231- D_234$ | $D_235- D_238$ | $D_239- D_242$ | $D_242- D_244, X$ |
| .................... | .................... | .................... | .................... |

| Bank 0 | Bank 1 | Bank 2 | Bank 3 |
|---|---|---|---|
| 505(0) | | | |
| 505(1) | | | |
| 505(2) | | | |
| : | | | |
| : | | | |
| 505(n) | | | |

| | | | |
|---|---|---|---|
| A0 A1 | ............................................. | A43 | A44 |
| B0 B1 | ............................................. | B43 | B44 |
| C0 C1 | ............................................. | C43 | C44 |
| D0 D1 | ............................................. | D43 | D44 |
| E0 E1 | ............................................. | E43 | E44 |
| F0 F1 | ............................................. | F43 | F44 |
| : | | | : |
| : | | | : |

FIGURE 5

| Bank 0 | Bank 1 | Bank 2 | Bank 3 |
|---|---|---|---|
| A0 – A3 | A4-A7 | A8-A11 | A12-A15 |
| A16 – A19 | A20-A23 | A24-A27 | A28-A31 |
| A32 – A35 | A36-A39 | A40-A43 | A44 XXX |
| XXXX | XXXX | B0 – B3 | B4-B7 |
| B8-B11 | B12-B15 | B16 – B19 | B20-B23 |
| B24-B27 | B28-B31 | B32 – B35 | B36-B39 |
| B40-B43 | B44 XXX | XXXX | XXXX |
| C0 – C3 | C4-C7 | C8-C11 | C12-C15 |
| C16 – C19 | C20-C23 | C24-C27 | C28-C31 |
| C32 – C35 | C36-C39 | C40-C43 | C44 XXX |
| XXXX | XXXX | D0 – D3 | D4-D7 |
| D8-D11 | D12-D15 | D16 – D19 | D20-D23 |
| D24-D27 | D28-D31 | D32 – D35 | D36-D39 |
| D40-D43 | D44 XXX | XXXX | XXXX |
| E0 – E3 | E4-E7 | E8-E11 | E12-E15 |
| E16 – E19 | E20-E23 | E24-E27 | E28-E31 |
| E32 – E35 | E36-E39 | E40-E43 | E44 XXX |
| XXXX | XXXX | F0 – F3 | F4-F7 |
| F8-F11 | F12-F15 | F16 – F19 | F20-F23 |
| F24-F27 | F28-F31 | F32 – F35 | F36-F39 |
| F40-F43 | F44 XXX | XXXX | XXXX |

| Bank 0 | Bank 1 | Bank 2 | Bank 3 |
|---|---|---|---|
| $A_0 0 - A_0 3$ | $A_0 4 - A_0 7$ | $A_0 8 - A_0 11$ | $A_0 12 - A_0 15$ |
| $A_0 16 - A_0 19$ | $A_0 20 - A_0 23$ | $A_0 24 - A_0 27$ | $A_0 28 - A_0 31$ |
| $A_0 32 - A_0 35$ | $A_0 36 - A_0 39$ | $A_0 40 - A_0 43$ | $A_0 44\ A_1 0 - A_1 2$ |
| $A_1 3 - A_1 6$ | $A_1 7 - A_1 10$ | $A_1 11 - A_1 14$ | $A_1 15 - A_1 18$ |
| $A_1 19 - A_1 22$ | $A_1 23 - A_1 26$ | $A_1 27 - A_1 30$ | $A_1 31 - A_1 34$ |
| $A_1 35 - A_1 38$ | $A_1 39 - A_1 42$ | $A_1 43, A_1 44, A_2 0, A_2 1$ | $A_2 2 - A_2 5$ |
| $A_2 6 - A_2 9$ | $A_2 10 - A_2 13$ | $A_2 14 - A_2 17$ | $A_2 18 - A_2 21$ |
| $A_2 22 - A_2 25$ | $A_2 26 - A_2 29$ | $A_2 30 - A_2 33$ | $A_2 34 - A_2 37$ |
| $A_2 38 - A_2 41$ | $A_2 42 - A_2 44\ X$ | $B_0 0 - B_0 3$ | $B_0 4 - B_0 7$ |
| $B_0 8 - B_0 11$ | $B_0 12 - B_0 15$ | $B_0 16 - B_0 19$ | $B_0 20 - B_0 23$ |
| $B_0 24 - B_0 27$ | $B_0 28 - B_0 31$ | $B_0 32 - B_0 35$ | $B_0 36 - B_0 39$ |
| $B_0 40 - B_0 43$ | $B_0 44\ B_1 0 - B_1 2$ | $B_1 3 - B_1 6$ | $B_1 7 - B_1 10$ |
| $B_1 11 - B_1 14$ | $B_1 15 - B_1 18$ | $B_1 19 - B_1 22$ | $B_1 23 - B_1 26$ |
| $B_1 27 - B_1 30$ | $B_1 31 - B_1 34$ | $B_1 35 - B_1 38$ | $B_1 39 - B_1 42$ |
| $B_1 43, B_1 44, B_2 0, B_2 1$ | $B_2 3 - B_2 6$ | $B_2 7 - B_2 10$ | $B_2 11 - B_2 14$ |
| $B_2 15 - B_2 18$ | $B_2 19 - B_2 22$ | $B_2 23 - B_2 26$ | $B_2 27 - B_2 30$ |
| $B_2 31 - B_2 34$ | $B_2 35 - B_2 38$ | $B_2 39 - B_2 42$ | $B_2 42 - B_2 44, X$ |
| $C_0 0 - C_0 3$ | $C_0 4 - C_0 7$ | $C_0 8 - C_0 11$ | $C_0 12 - C_0 15$ |
| $C_0 16 - C_0 19$ | $C_0 20 - C_0 23$ | $C_0 24 - C_0 27$ | $C_0 28 - C_0 31$ |
| $C_0 32 - C_0 35$ | $C_0 36 - C_0 39$ | $C_0 40 - C_0 43$ | $C_0 44\ C_1 0 - C_1 2$ |
| $C_1 3 - C_1 6$ | $C_1 7 - C_1 10$ | $C_1 11 - C_1 14$ | $C_1 15 - C_1 18$ |
| $C_1 19 - C_1 22$ | $C_1 23 - C_1 26$ | $C_1 27 - C_1 30$ | $C_1 31 - C_1 34$ |
| $C_1 35 - C_1 38$ | $C_1 39 - C_1 42$ | $C_1 43, C_1 44, C_2 0, C_2 1$ | $C_2 2 - C_2 5$ |
| $C_2 6 - C_2 9$ | $C_2 10 - C_2 13$ | $C_2 14 - C_2 17$ | $C_2 18 - C_2 21$ |
| $C_2 22 - C_2 25$ | $C_2 26 - C_2 29$ | $C_2 30 - C_2 33$ | $C_2 34 - C_2 37$ |
| $C_2 38 - C_2 41$ | $C_2 42 - C_2 44\ X$ | $D_0 0 - D_0 3$ | $D_0 4 - D_0 7$ |
| $D_0 8 - D_0 11$ | $D_0 12 - D_0 15$ | $D_0 16 - D_0 19$ | $D_0 20 - D_0 23$ |
| $D_0 24 - D_0 27$ | $D_0 28 - D_0 31$ | $D_0 32 - D_0 35$ | $D_0 36 - D_0 39$ |
| $D_0 40 - D_0 43$ | $D_0 44\ D_1 0 - D_1 2$ | $D_1 3 - D_1 6$ | $D_1 7 - D_1 10$ |
| $D_1 11 - D_1 14$ | $D_1 15 - D_1 18$ | $D_1 19 - D_1 22$ | $D_1 23 - D_1 26$ |
| $D_1 27 - D_1 30$ | $D_1 31 - D_1 34$ | $D_1 35 - D_1 38$ | $D_1 39 - D_1 42$ |
| $D_1 43, D_1 44, D_2 0, D_2 1$ | $D_2 3 - D_2 6$ | $D_2 7 - D_2 10$ | $D_2 11 - D_2 14$ |
| $D_2 15 - D_2 18$ | $D_2 19 - D_2 22$ | $D_2 23 - D_2 26$ | $D_2 27 - D_2 30$ |
| $D_2 31 - D_2 34$ | $D_2 35 - D_2 38$ | $D_2 39 - D_2 42$ | $D_2 42 - D_2 44, X$ |
| ............ | ............ | ............ | ............ |

FIGURE 8

STORING MACROBLOCKS FOR CONCATENATED FRAMES

RELATED APPLICATIONS

This application claims priority to Provisional Application Ser. No. 60/495,405, filed Aug. 15, 2003, entitled "Storing Macroblocks for Concatenated Frames".

This application is related to Provisional App. Ser. No. 60/484,512, filed Jul. 2, 2003, entitled "System, Method, and Apparatus for Efficiently Storing Macroblocks in SD-RAM", and Provisional App. Ser. No. 60/484,830, filed Jul. 3, 2003, entitled "SYSTEM, METHOD, AND APPARATUS FOR EFFICIENTLY STORING MACROBLOCKS", each of which are incorporated by reference for all purposes.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

One of the major challenges in designing a memory subsystem is organizing data in such a way, as to enable efficient memory access that would increase the system throughput. Data organization in the memory becomes even more a bigger challenge in a UMA (Unified Memory Architecture) subsystem, where it has a direct impact on the efficiency of the system as a whole. Therefore data in the memory should be organized in such a way that, a high bandwidth client (a client is an agent that initiates data transfer between itself and the memory subsystem) benefits the most without compromising the access efficiency of the other low bandwidth clients. In other words the data organization in the memory should help reduce the DDR-SDRAM overheads for high bandwidth clients, which in turn would improve the efficiency of the memory subsystem as a whole.

In a video decompression-engine (a.k.a video decoder) a substantial portion of the system bandwidth is utilized in transacting video pixel data. The video decoder uses the neighboring macro-block (a macro block is a 16×16 pixel block) data from the previous and future frames of the video to predict the current macro-block information. Thus the right choice would be to have a memory subsystem that is macro-block oriented.

However the current column sizes in the DDR-SDRAM technology does not allow us to pack a full macro-block row information in one bank of the DRAM for a SD size picture. At the same time, a very simple linear arrangement of macro-block continuously in the same bank of the DDR-SDRAM would increase the SDRAM overheads, as an adjacent or vertical neighbor macro-block fetch would require a different row of the same bank to be activated. In such a case, the current row of the current bank needs to be precharged and a new row of the same bank needs to be activated, thus resulting in roughly 6-clocks overhead per row change. In the worst case, a particular video decode fetch could involve four macro-blocks worth data, lying in four different rows of the same bank, resulting in as high as 18 (three row switching) clocks overhead. On the other hand, if the adjacent or vertical macro-block were to exist in different banks of the DRAM, it would be possible to reduce the SDRAM overhead to zero in the best case and the worst case numbers will be much less that 18 clocks.

Conventionally, four macro blocks worth data are packed into one bank, before switching to the next bank of the DDR-SDRAM. This packing would be efficient for images, whose number of horizontal macro-block (NMBX) follows the equation, $$NMBX=16*N+8$$

(where N is any positive integer)

The above equation ensures efficient data fetching & packing for a HD size picture (NMBX=120). However for a SD size picture (NMBX=45), the closest value of N, that satisfies the above equation=4, resulting in NMBX required=56. This means we have 11 macro-blocks, wasted for every macro-block row of the image. For a SD size picture this would be roughly 75 Kbytes of wasted memory per frame storage (roughly 20% wastage per frame).

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Presented herein is a system for storing macroblocks for concatenated frames. In one embodiment, there is a circuit for decoding video data. The circuit comprises an instruction memory and a processor. The instruction memory stores a plurality of executable instructions. The processor executes the plurality of executable instructions. The execution of the plurality of executable instructions causes storing a portion of a first frame in a row of memory, and storing a portion of a second frame in the row of memory.

In another embodiment, there is a circuit for decoding video data. The circuit comprises an instruction memory and a processor. The instruction memory stores a plurality of executable instructions. The processor executes the plurality of executable instructions. The execution of the plurality of executable instructions causes storing a first macroblock row of a first frame in a first one or more rows of memory, storing a first macroblock row of a second frame in a second one or more rows of memory, and a particular one of the first one or more rows of memory being adjacent to a particular one of the second one or more rows of memory.

In another embodiment, there is presented a method for decoding video data. The method comprises storing a portion of a first frame in a row of memory, and storing a portion of a second frame in the row of memory.

In another embodiment, there is presented a method for decoding video data. The method comprises storing a first macroblock row of a first frame in a first one or more rows of memory, storing a first macroblock row of a second frame in a second one or more rows of memory, and a particular one of the first one or more rows of memory being adjacent to a particular one of the second one or more rows of memory.

These and other advantages and novel features of the present invention, as well as details of an illustrated embodiment thereof, will be more fully understood from the following description and drawings.

BRIEF DESCRIPTION OF THE DRAWINGS

FIG. 4 is a block diagram of an exemplary DRAM;

FIG. 5 is a block diagram of an exemplary SDTV frame;

FIG. 6 is a block diagram describing the storage of a frame in accordance with an embodiment of the present invention;

FIG. 7 is a block diagram of three horizontally concatenated frames; and

FIG. 8 is a block diagram describing the storage of the frames in accordance with an embodiment of the present invention.

DETAILED DESCRIPTION OF PREFERRED EMBODIMENTS

Figure 1:
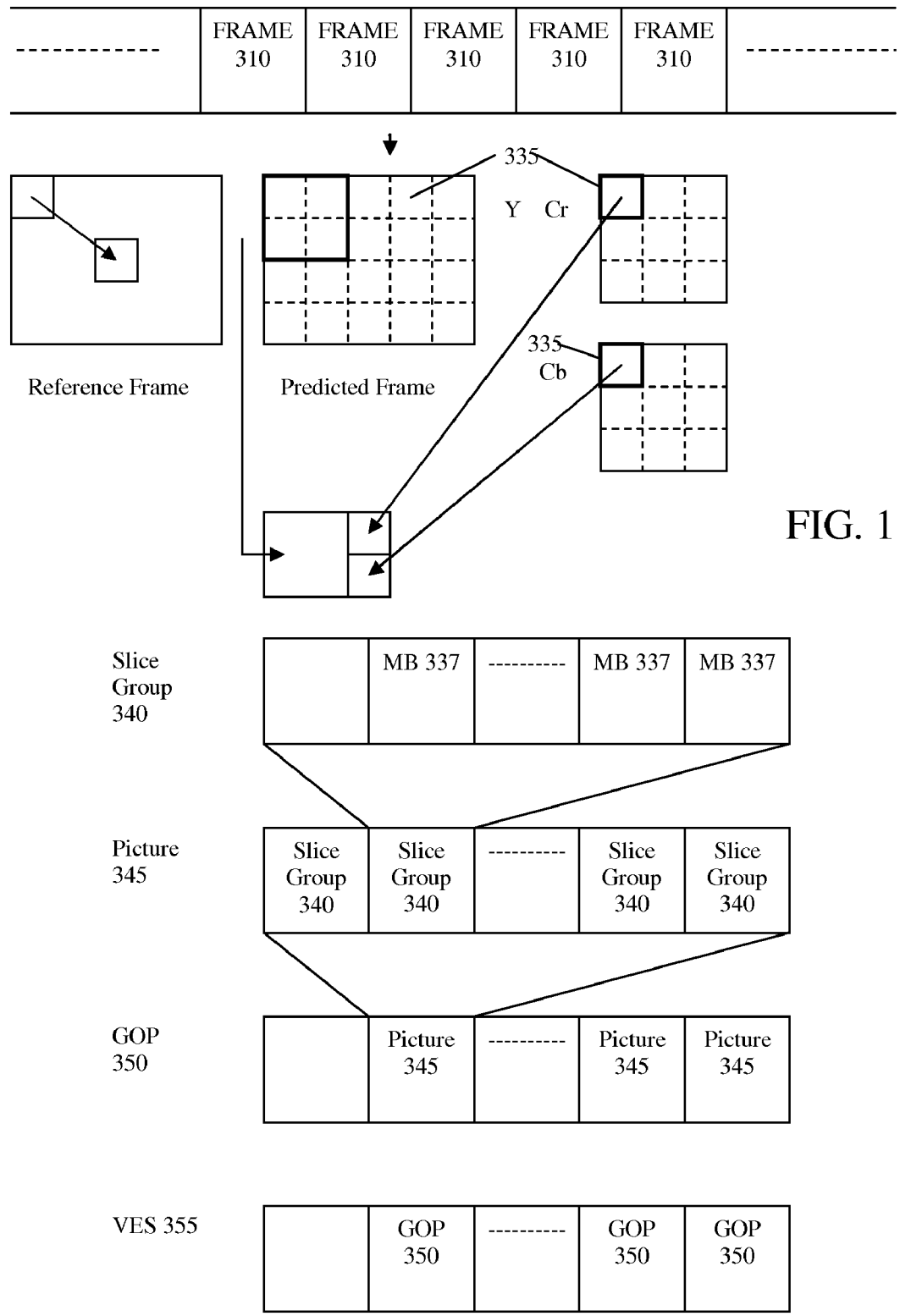
FIG. 1 is a block diagram describing the encoding of video data.

Referring now to FIG. 1, there is illustrated a block diagram describing MPEG formatting of video data 305. The video data 305 comprises a series of frames 310. Each frame comprises two dimensional grids of luminance Y, chroma red Cr, and chroma blue Cb pixels 315. The two-dimensional grids are divided into 8×8 blocks 335, where four blocks 335 of luminance pixels Y are associated with a block 335 of chroma red Cr, and a block 335 of chroma blue Cb pixels. The four blocks of luminance pixels Y, the block of chroma red Cr, and the chroma blue Cb form a data structure known as a macroblock 337. The macroblock 337 also includes additional parameters, including motion vectors.

The data in the macroblocks 337 is compressed in accordance with algorithms that take advantage of temporal and spatial redundancies. For example, in a motion picture, neighboring frames 310 usually have many similarities. Motion between frames increases differences between frames. Motion compensation can be used to reduce these differences. When an object moves across a screen, the object may appear in different positions in different frames, but the object does not change substantially in appearance. The picture differences can be reduced by measuring and recording the motion as a vector. The vector can be used during decoding to shift a macroblock 337 of one frame to a more appropriate part of another frame.

Accordingly, most of the macroblocks 337 are compared to portions of other frames 310 (reference frames). When an appropriate portion of a reference frame 310 is found, the differences between the portion of the other frame 310 and the macroblock 337 are encoded. The location of the portion in the reference frame 310 is recorded as a motion vector. The encoded difference and the motion vector form part of the data structure encoding the macroblock 337. In MPEG-2, the macroblocks 337 from one frame 310 (a predicted frame) are limited to prediction from portions of no more than two reference frames 310. It is noted that frames 310 used as a reference frame 310 for a predicted frame 310 can be a predicted frame 310 from another reference frame 310.

The macroblocks 337 representing a frame are grouped into different slice groups 340. The slice group 340 includes the macroblocks 337 in the slice group 340, as well as additional parameters describing the slice group. Each of the slice groups 340 forming the frame form the data portion of a picture structure 345. The picture 345 includes the slice groups 340 as well as additional parameters. The pictures are then grouped together as a group of pictures 350. The group of pictures 350 also includes additional parameters. Groups of pictures 350 are then stored, forming what is known as a video elementary stream 355. The video elementary stream 355 is then packetized to form a packetized elementary sequence 360. Each packet is then associated with a transport header 365a, forming what are known as transport packets 365b.

The transport packets 365b can be multiplexed with other transport packets 365b carrying other content, such as another video elementary stream 355 or an audio elementary stream. The multiplexed transport packets from what is known as a transport stream. The transport stream is transmitted over a communication medium for decoding and presentation.

Figure 2:
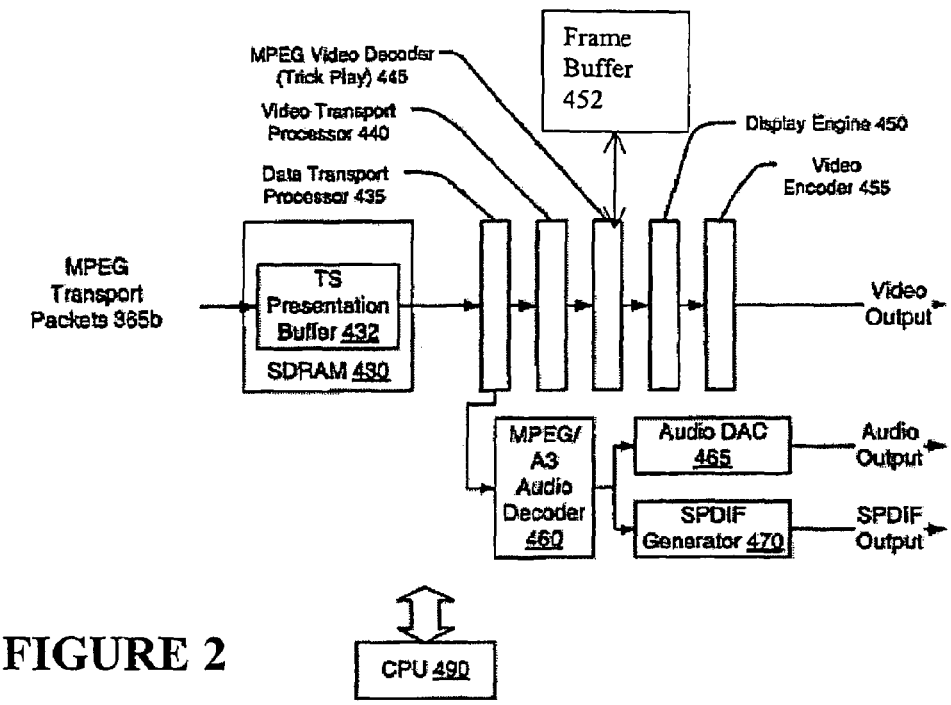
FIG. 2 is a block diagram of a decoder system in accordance with an embodiment of the present invention.

Referring now to FIG. 2, there is illustrated a block diagram of an exemplary decoder system for decoding compressed video data, configured in accordance with an embodiment of the present invention. A processor, that may include a CPU 490, reads transport stream 465 into a transport stream buffer 432 within an SDRAM 430.

The data is output from the transport stream buffer 432 and is then passed to a data transport processor 435. The data transport processor 435 then demultiplexes the transport stream 465 into constituent transport streams. The constituent packetized elementary stream can include for example, video transport streams, and audio transport streams. The data transport processor 435 passes an audio transport stream to an audio decoder 460 and a video transport stream to a video transport processor 40.

The video transport processor 440 converts the video transport stream into a video elementary stream and provides the video elementary stream to a video decoder 445. The video decoder 445 decodes the video elementary stream, resulting in a sequence of decoded video frames. The decoding can include decompressing the video elementary stream. It is noted that there are various standards for compressing the amount of data required for transportation and storage of video data, such as MPEG-2. The video decoder 445 decompresses the video data.

A display engine 450 is responsible for and operable to select a frame (or field) for display at every vertical synchronization pulse, scale the frame, render the graphics, construct the complete display, and rasterize the frame, among other functions. The rasterized frame is passed to a video encoder 455 where it is converted to analog video using an internal digital to analog converter (DAC). The digital audio is converted to analog in the audio digital to analog converter (DAC) 465.

The decoded video data includes a series of frames 310. The frames 310 are stored in frame buffers 452. The frame buffers 452 can be dynamic random access memory (DRAM) comprising 128 bit/16 byte gigantic words (gwords). As noted above, most macroblocks 337 in predicted frames 310 are encoded as an offset or difference from portions of reference frames 310. Accordingly, the MPEG video decoder 445 decodes the reference frames 310 prior to decoding predicted frames 310 that are predicted thereon. The decoded reference frames 310 are stored in frame buffers 452. The MPEG video decoder 445 fetches the portions of the reference frames 310 from the frame buffers 452 to decode macroblocks 337 from the predicted frame 310.

Figure 3:
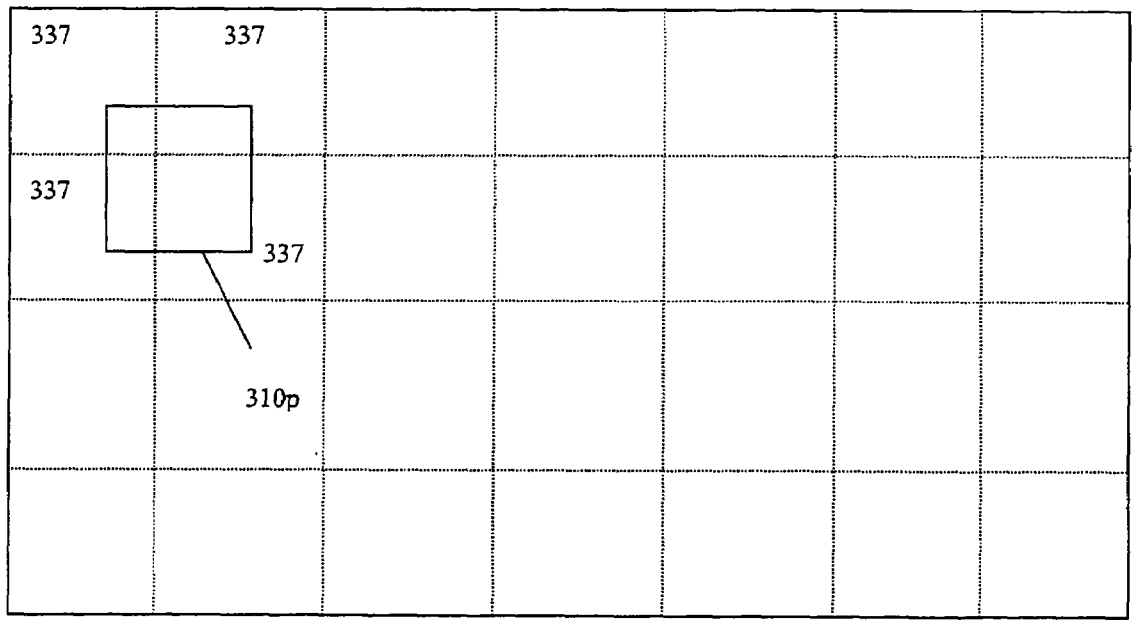
FIG. 3 is a block diagram of an exemplary reference frame.

Referring now to FIG. 3, there is illustrated a block diagram of a reference frame 310. As noted above, the frame 310 is decoded on a macroblock by macroblock 337 basis. Macroblocks 337 of another frame 310 can be encoded as an offset or difference from portions 310p of the frame 310. The portions 310p are not necessarily aligned with macroblocks 337. A portion 310p can potentially straddle four adjacent macroblocks 337. The MPEG video decoder 445 retrieves the macroblocks 337, containing the portion 310 for decoding a macroblock 337 in a predicted frame 310.

Referring now to FIG. 4, there is illustrated a block diagram of an exemplary DRAM 500. The DRAM 500 comprises four banks, bank 0, bank 1, bank 2, and bank 3. Each bank comprises any number of rows 505(0) . . . 505(n). Each row of a bank has 32 byte jumbo words (jword). The luma Y portion of the macroblocks 337 occupy 8 j-words. Therefore, each row of a bank can store the luma pixels from four macroblocks 337.

To access data, a bank is charged while the bank is charged, data from one row of the bank can be accessed. Access to other rows of the bank occurs after the first access is completed. Each memory access is associated with overhead time. As noted above, the video decoder 445 to fetch a portion for decoding a macroblock 337, the video decoder 445 may fetch up to four adjacent macroblocks. The time for decoding can be reduced by fetching each of the macroblocks 337 in pipeline. However, if the macroblocks 337 occupy different rows of the same bank, the requests cannot occur in pipeline with many internal banks of DRAMS. To avoid this, the frame 310 can be stored in a frame buffer 452 in a manner such every set of four covering macroblocks 337 are stored in either different banks or the same row of a bank.

Referring now to FIG. 5, there is illustrated a block diagram of an exemplary decoded standard definition TV (SDTV) reference frame 310. The reference frame 310 can be divided into macroblocks, A0 . . . A44, B0 . . . B44, C0 . . . C44, D0 . . . D44, E0 . . . E44, F0 . . . F44, etc. The macroblocks comprise 16×16 blocks of luma pixels and two 8×8 blocks of chroma pixels. An SDTV reference frame comprises 45 macroblocks, e.g., A0 . . . A44, across each row.

Referring now to FIG. 6, there is illustrated a block diagram of an exemplary frame buffer storing a frame in accordance with an embodiment of the present invention. The frame buffer comprises four banks, bank 0, bank 1, bank 2, and bank 3. Each bank has any number of rows, indicated by the rows in the table. Each row of each bank can store 4 macroblocks.

The video decoder 445 stores a macroblock row, e.g., macroblocks A0 . . . A44, starting with bank 0 (A0 . . . A3), and proceeding to bank 1 (A4 . . . A7), bank 2 (A8 . . . A11), bank 3 (A12 . . . A15) and repeating until the last macroblock A44 is stored in bank 3. The next macroblock row, e.g., B0 . . . B44, is stored starting from bank 2. The next macroblock row, e.g., C0 . . . C44, is stored starting from bank 0, again. Each successive row is stored starting from either bank 0 or bank 2, in alternating fashion. For storing of a macroblock row from bank 0 and ending the macroblock row in bank 1, or starting storage of the macroblock row from bank 2, and ending the macroblock row in bank 3, a total of 16*N+8 (where N is an integer, or the whole number of rows) macroblocks are needed for completely using all of the memory. However, an SDTV frame comprises 45 macroblocks across each row. To accommodate 45 macroblocks, the amount of memory required to store 56 macroblocks (N=3) is used.

As can be seen, a hole comprising the memory for storing 11 macroblocks is left empty (indicated by an X) per macroblock row. The amount of memory that actually stores data as percentage of the memory that is allocated for the macroblock row is approximately 80%, while approximately 20% is empty.

To reduce the proportion of unused memory, three SDTV frames can be concatenated horizontally. The concatenated frame can be stored as if the concatenated frame was a single frame.

Pursuant to the MPEG-2 standard, at least three frames are stored in the frame buffer at a given time. Two the frames are reference frames, a past prediction frame, and a future prediction frame. The third frame can be the most recently decoded frame, and can be decoded from the past prediction frame and the future prediction frame. Accordingly, the foregoing three frames can be stored in the frame buffer in the manner described above, as if they were a single horizontally concatenated frame.

Figures 7, 8:
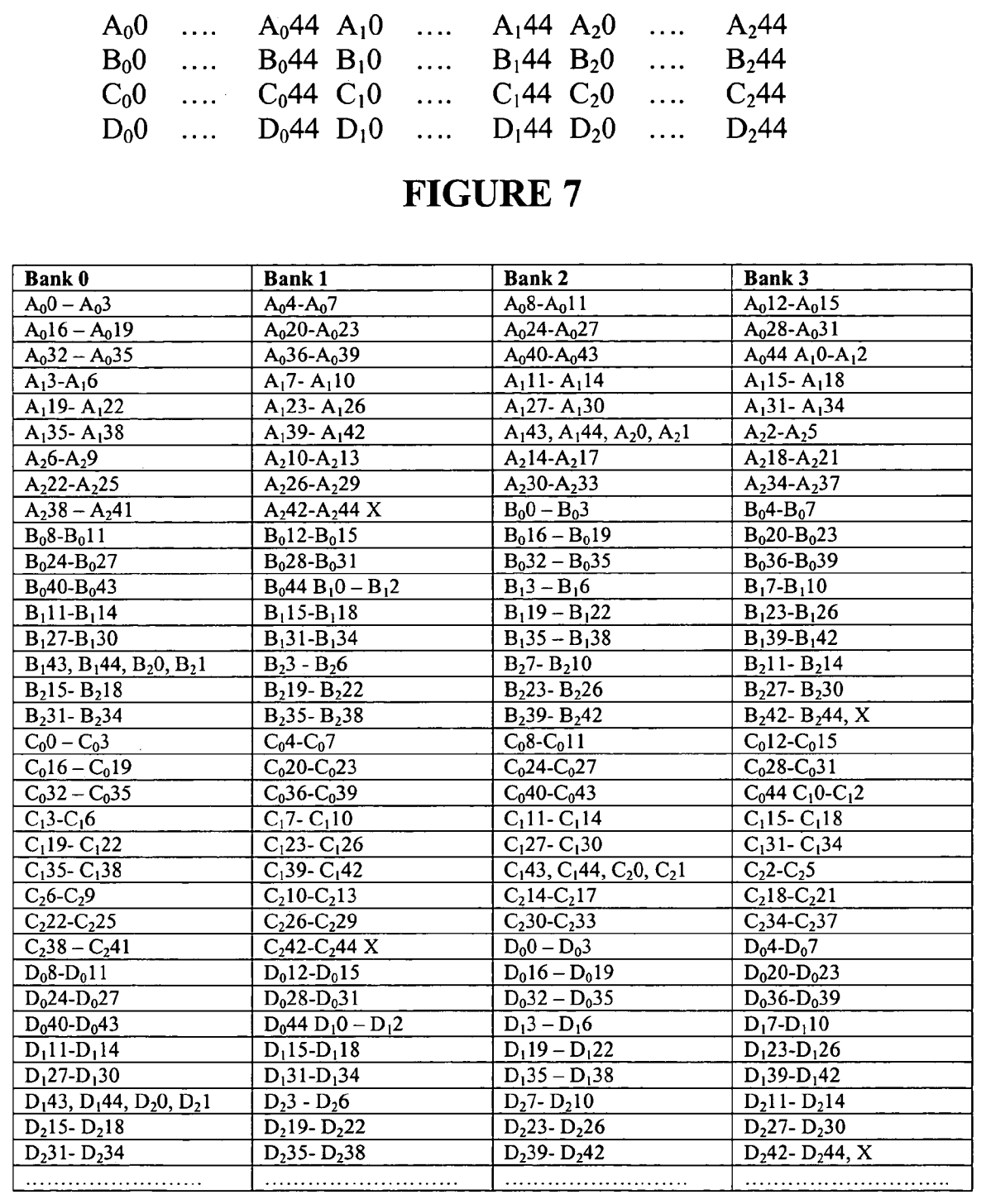

Referring now to FIG. 7, there is illustrated a block diagram of three horizontally concatenated frames. Each letter element represents a macroblock, while the subscript identifies the frame, and the following numeral represents the ordinal position of the macroblock within the macroblock row of the frame.

FIG. 8 is a block diagram of a frame buffer 452 storing the frames described in FIG. 7. The video decoder 445 stores the first macroblock row of the first frame, $A_0 0 \ldots A_0 44$, starting with bank 0 ($A_0 0 \ldots A_0 3$), proceeding to bank 1 ($A_0 4 \ldots A_0 7$), to bank 2 ($A_0 8 \ldots A_0 11$), and to bank 3 ($A_0 12 \ldots A_0 15$), and repeating until the last macroblock $A_0 44$ is stored in bank 3.

After storing the first macroblock row of the first frame, the video decoder 445 stores the first macroblock row of the second frame, $A_1 0 \ldots A_1 44$. The video decoder 445 starts with bank 3 ($A_1 0 \ldots A_1 2$), proceeding to bank zero ($A_1 3 \ldots A_1 6$), to bank 1 ($A_1 7 \ldots A_1 10$), and to bank 2 ($A_1 11 \ldots A_1 14$) and repeating until the last macroblock $A_1 44$ is stored in bank 2.

After storing the first macroblock row of the second frame the video decoder 445 stores the first macroblock row of the third frame, ($A_2 0 \ldots A_2 44$). The video recorder 445 starts with bank 2 ($A_2 0, A_2 1$), proceeding to bank 3 ($A_2 2 \ldots A_2 5$), to bank 0 ($A_2 6 \ldots A_2 9$) and to bank 1 ($A_2 10 \ldots A_2 13$), and repeating until the last macroblock $A_2 44$ in row bank 1. After storing the first macroblock row of each frame, $A_0 0 \ldots A_0 44$, $A_1 0 \ldots A_1 44$, and $A_2 0 \ldots A_2 44$ the video decoder 445 skips the remaining portion of bank 1 and stores the second macroblock row of each frame $B_0 1 \ldots B_0 44$, $B_1 0 \ldots B_1 44$, and $B_2 0 \ldots B_2 44$ starting from bank 2. The next macroblock row of each frame, $C_0 0 \ldots C_0 44$, $C_1 0 \ldots C_1 44$, and $C_2 0 \ldots C_2 44$ starting from bank 0. Each successive row is stored starting from either bank 0 or bank 2 in an alternating fashion.

As can be seen, a hole comprising the memory for storing 1 macroblock is left empty (indicated by an X) per 3 macroblock rows. The amount of memory that actually stores data as a percentage of the memory that is allocated for the macroblock row is over 99%.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor can be implemented as part of an ASIC device with various functions implemented as firmware.

While the invention has been described with reference to certain embodiments, it will be understood by those skilled in the art that various changes may be made and equivalents may be substituted without departing from the scope of the invention. In addition, many modifications may be made to adapt particular situation or material to the teachings of the invention without departing from its scope. Therefore, it is intended that the invention not be limited to the particular embodiment(s) disclosed, but that the invention will include all embodiments falling within the scope of the appended claims.

The invention claimed is:

1. A circuit for decoding video data, said circuit comprising:
   an instruction memory for storing a plurality of executable instructions;
   a processor for executing the plurality of executable instructions, the execution of the plurality of executable instructions causing:
      storing a portion of a first frame in a row of a bank of a memory;
      storing a portion of a second frame in the same row of the same bank of the memory; and
      providing a particular one of the portions of either the first frame or the second frame upon receiving a request for the particular one of the portions.

2. The circuit of claim 1, wherein the portion of the first frame and the portion of the second frame comprises a macroblock.

3. The circuit of claim 1, wherein the portion of the first frame is in a top half of the first frame, and wherein the portion of the second frame is in a top half of the second frame.

4. The circuit of claim 1, wherein:
   storing a portion of a first frame in a row of a bank of a memory further comprises storing the portion of the first frame in the row of the bank in a first memory device; and
   storing a portion of a second frame in the same row of the same bank of the memory further comprises storing the portion of the first frame in the same row of the same bank of the same memory device.

5. A circuit for decoding video data, said circuit comprising:
   an instruction memory for storing a plurality of executable instructions;
   a processor for executing the plurality of executable instructions, the execution of the plurality of executable instructions causing:
      storing a top macroblock row of a first frame in a first one or more rows of memory;
      storing a top macroblock row of a second frame in a second one or more rows of memory; and
      providing a particular one of the macroblocks of either the first frame or the second frame upon receiving a request for the particular one of the macroblocks; and
   a particular one of the first one or more rows of memory being adjacent to a particular one of the second one or more rows in the same bank of memory.

6. The circuit of claim 5, wherein the first one or more rows of memory are contiguous, and wherein the second one or more rows of memory are contiguous.

7. The circuit of claim 5, wherein execution of the plurality of instructions further causes:
   storing a top macroblock row of a third frame in a third one or more rows of memory; and
   wherein a particular one of the third one or more rows of memory are adjacent to another particular one of the second one or more rows of memory.

8. The circuit of claim 7, wherein execution of the plurality of instructions further causes:
   storing a second macroblock row of the first frame in a fourth one or more rows of memory;
   the third one or more rows of memory being continuous; and
   wherein a particular one of the fourth one or more rows is adjacent to another particular one of the third one or more rows of memory.

9. A method for decoding video data, said method comprising:
   storing a portion of a first frame in a row of a bank of memory; and
   storing a portion of a second frame in the same row of the same bank of memory; and
      providing a particular one of the portions of either the first frame or the second frame upon receiving a request for the particular one of the portions.

10. The method of claim 9, wherein the portion of the first frame and the portion of the second frame comprises a macroblock.

11. The method of claim 9, wherein the portion of the first frame is in a top half of the first frame, and wherein the portion of the second frame is in a top half of the second frame.

12. A method for decoding video data, said method comprising:
   storing a top macroblock row of a first frame in a first one or more rows of memory;
   storing a top macroblock row of a second frame in a second one or more rows of memory; and
   providing a particular one of the macroblocks of either the first frame or the second frame upon receiving a request for the particular one of the macroblocks; and
   a particular one of the first one or more rows of memory being adjacent to a particular one of the second one or more rows in the same bank of memory.

13. The method of claim 12, wherein the first one or more rows of memory are contiguous, and wherein the second one or more rows of memory are contiguous.

14. The method of claim 13, said method further comprising:
   storing a top macroblock row of a third frame in a third one or more rows of memory; and
   wherein a particular one of the third one or more rows of memory are adjacent to another particular one of the second one or more rows of memory.

15. The method of claim 14, further comprising:
   storing a second macroblock row of the first frame in a fourth one or more rows of memory;
   the third one or more rows of memory being continuous; and
   wherein a particular one of the fourth one or more rows is adjacent to another particular one of the third one or more rows of memory.

* * * * *